(12) United States Patent
Lee

(10) Patent No.: US 11,964,622 B2
(45) Date of Patent: Apr. 23, 2024

(54) VEHICLE OCCUPANT PROTECTION APPARATUS AND METHOD

(71) Applicant: HYUNDAI MOBIS CO., LTD., Seoul (KR)

(72) Inventor: Dae Sung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 207 days.

(21) Appl. No.: 17/688,098

(22) Filed: Mar. 7, 2022

(65) Prior Publication Data

US 2022/0281399 A1    Sep. 8, 2022

(30) Foreign Application Priority Data

Mar. 8, 2021 (KR) .................. 10-2021-0030378

(51) Int. Cl.
| | |
|---|---|
| *B60R 21/0136* | (2006.01) |
| *B60N 2/06* | (2006.01) |
| *B60N 2/14* | (2006.01) |
| *B60R 21/0132* | (2006.01) |
| *B60R 21/207* | (2006.01) |
| *B60R 21/231* | (2011.01) |

(52) U.S. Cl.
CPC .......... *B60R 21/0136* (2013.01); *B60N 2/06* (2013.01); *B60N 2/14* (2013.01); *B60R 21/0132* (2013.01); *B60R 21/207* (2013.01); *B60R 21/23138* (2013.01); *B60R 2021/23146* (2013.01)

(58) Field of Classification Search
CPC .......... B60R 21/23138; B60R 21/0134; B60R 2021/0006; B60R 2021/01013
See application file for complete search history.

(56) References Cited

U.S. PATENT DOCUMENTS

| | | | | |
|---|---|---|---|---|
| 3,981,518 | A * | 9/1976 | Pulling .............. | B60N 2/4279 180/274 |
| 5,149,165 | A * | 9/1992 | Woolley ............ | B60N 2/42736 180/274 |
| 5,328,234 | A * | 7/1994 | Daniel ............... | B60N 2/42745 296/68.1 |
| 6,209,909 | B1 * | 4/2001 | Breed ................. | G08G 1/161 280/736 |
| 6,755,273 | B2 * | 6/2004 | Breed ................. | B60R 19/205 180/274 |
| 6,959,944 | B2 * | 11/2005 | Mori .................. | B60R 21/206 280/730.2 |
| 7,124,851 | B2 * | 10/2006 | Smith ................. | B60R 21/013 296/68.1 |

(Continued)

FOREIGN PATENT DOCUMENTS

KR    10-1526715 B1    6/2015

*Primary Examiner* — Phutthiwat Wongwian
*Assistant Examiner* — Arnold Castro
(74) *Attorney, Agent, or Firm* — NovoTechIP International PLLC

(57) ABSTRACT

Proposed are a vehicle occupant protection apparatus and method. A vehicle sensor detects a target present around a vehicle. A drive unit is configured to increase a space between a side structure of the vehicle and an occupant in the event of a side collision between the vehicle and the target collide. A space control unit controls the drive unit in response to detection information detected by the vehicle sensor to protect the occupant from the side structure.

20 Claims, 12 Drawing Sheets

(56) References Cited

U.S. PATENT DOCUMENTS

| | | | | |
|---|---|---|---|---|
| 7,374,223 B2* | 5/2008 | Dauber | ............... | B60N 2/062 |
| | | | | 296/65.11 |
| 7,783,403 B2* | 8/2010 | Breed | ............... | G01S 13/931 |
| | | | | 340/995.13 |
| 7,802,809 B2* | 9/2010 | Ryan | ............... | B60R 21/213 |
| | | | | 280/730.2 |
| 8,136,835 B2* | 3/2012 | Rajasingham | ........... | B60N 2/68 |
| | | | | 280/730.2 |
| 9,533,651 B1* | 1/2017 | Ohno | ............... | B60N 2/914 |
| 10,232,814 B2* | 3/2019 | Gandhi | ............ | B60R 21/0134 |
| 10,611,269 B1* | 4/2020 | Larner | ............ | B60N 2/4207 |
| 2002/0166710 A1* | 11/2002 | Breed | .............. | B60R 25/25 |
| | | | | 180/282 |
| 2005/0127645 A1* | 6/2005 | Smith | ............... | B60N 2/015 |
| | | | | 180/274 |
| 2009/0218794 A1* | 9/2009 | Melz | ............... | B60R 21/0428 |
| | | | | 280/730.2 |
| 2011/0004377 A1* | 1/2011 | Harase | ............ | B60R 21/0136 |
| | | | | 701/45 |
| 2014/0077482 A1* | 3/2014 | Giesler | ............ | B60R 21/0134 |
| | | | | 280/735 |
| 2018/0208164 A1* | 7/2018 | Carbaugh | ............ | G01S 13/931 |
| 2020/0339115 A1* | 10/2020 | Mase | ............... | B60W 30/0953 |
| 2021/0394698 A1* | 12/2021 | Tanabe | ............... | B60N 2/777 |
| 2022/0001821 A1* | 1/2022 | Yoshida | ............... | B60R 21/232 |
| 2022/0203924 A1* | 6/2022 | Jayakar | ............... | B60R 21/205 |
| 2022/0203971 A1* | 6/2022 | Qin | ............... | B60W 30/0956 |
| 2022/0281399 A1* | 9/2022 | Lee | ............... | B60N 2/42736 |
| 2023/0158991 A1* | 5/2023 | Nagasawa | ............ | B60R 21/233 |
| | | | | 280/730.2 |

* cited by examiner

VEHICLE OCCUPANT PROTECTION APPARATUS AND METHOD

CROSS-REFERENCE TO RELATED APPLICATIONS

This application claims priority from and the benefit of Korean Patent Application No. 10-2021-0030378, filed on Mar. 8, 2021, which is hereby incorporated by reference for all purposes as if set forth herein.

BACKGROUND

1. Technical Field

Exemplary embodiments of the present disclosure relate to a vehicle occupant protection apparatus and method, and more particularly, to a vehicle occupant protection apparatus and method which protects an occupant from a side structure of a vehicle in the event of a side collision of a vehicle.

2. Discussion of Related Art

Technologies for ensuring driving performance, convenience, and functionality of vehicles, as well as the safety of occupants, have been developed. In particular, among a variety of safety devices used in a vehicle, an airbag is being applied as the most efficient means for protecting an occupant from impact.

The airbag is a means for protecting an occupant in the event of a vehicle collision, and includes a collision sensor detecting the vehicle collision, a controller operating the airbag in response to the result of the detection of the collision sensor, and an airbag module operating the airbag in response to a signal from the controller. In addition, airbags may be categorized into a driver airbag, an airbag for the seat next to the driver, a side airbag, a roof airbag, and the like according to the position of provision of the airbags or an object to be protected.

In the meantime, a space between a side structure and an occupant in a vehicle is relatively small compared to that in the front. Thus, a side airbag configured to be deployed in the event of a side collision of a vehicle is required to be deployed relatively fast. That is, since the side airbag does not have a sufficient space and time for the deployment of the airbag, there is a problem in that an occupant may be injured by a side structure of the vehicle in the event of a side collision.

The background art of the present disclosure is disclosed in Korean Patent No. 10-1526715 (Jun. 1, 2015), titled "VEHICLE SIDE AIRBAG DEPLOYMENT SYSTEM AND METHOD."

SUMMARY

Various embodiments are directed to a vehicle occupant protection apparatus and method configured to increase a space between a side structure of a vehicle and an occupant before a side collision of the vehicle and rapidly adjust the deployment time of a side airbag in the event of an actual collision, thereby more safely protecting the occupant in the event of a side collision.

According to an aspect of the present disclosure, provided is a vehicle occupant protection apparatus including: a vehicle sensor detecting a target present around a vehicle; a drive unit configured to increase a space between a side structure of the vehicle and an occupant in the event of a side collision between the vehicle and the target collide; and a space control unit controlling the drive unit in response to detection information detected by the vehicle sensor to protect the occupant from the side structure.

The space control unit according to the present disclosure may include: a target detection section detecting a target present in a predetermined collision area in accordance with detection information detected by the vehicle sensor; a determination section detecting a time of collision with the target, and determining whether or not to form a space according to the time of collision; and a continuity determination section determining continuity of the determination of whether or not to form the space by the determination section.

The target detection section according to the present disclosure may include: a risk target detector selecting a target present in a predetermined risk target area as a risk target by detecting a relative velocity between the vehicle and the target; and a collision target detector selecting a target present in a predetermined collision target area as a collision target by detecting a relative distance and a relative velocity between the vehicle and the target.

The determination section according to the present disclosure may include: a collision time calculator calculating the time of collision with the target present in the collision area; and a collision time calculator comparing the time of collision with a predetermined threshold time of collision and determining the space to be formed according to whether or not the time of collision is equal to or smaller than the threshold time of collision.

The continuity determination section according to the present disclosure may determine that there is the continuity when the number of times that the determination section determines to form the space is equal to or greater than a predetermined number of times.

The space control unit according to the present disclosure may include a severity calculation section calculating severity according to a relative velocity and a relative distance between the vehicle and the target.

The severity calculation section according to the present disclosure may calculate the severity using a relative velocity weight in the Y axis direction with respect to the target, a relative velocity weight in the X axis direction with respect to the target, a relative distance weight in the Y axis direction with respect to the target, a relative distance weight in the X axis direction with respect to the target, and a weight of an angle of entry of the target.

The apparatus according to the present disclosure may further include a side airbag deployment module configured to deploy the side airbag by adjusting a deployment time according to the severity in the event of the side collision between the vehicle and the target.

The side airbag deployment module according to the present disclosure may include: an airbag sensor detecting the side collision between the vehicle and the target; a side airbag driver configured to deploy the side airbag; an airbag deployment threshold value adjustment section adjusting an airbag deployment threshold value according to the severity; and a side airbag deployment controller adjusting the deployment time according to the airbag deployment threshold value adjusted by the airbag deployment threshold value adjustment section when the side collision between the vehicle and the target is detected by the airbag sensor and controlling the side airbag to driver deploy the side airbag according to the deployment time.

The side airbag deployment controller according to the present disclosure may reduce the deployment time of the side airbag by reducing the airbag deployment threshold value as the severity increases.

The drive unit according to the present disclosure may drive a seat in a direction in which a distance between the side structure and the occupant increases.

The drive unit according to the present disclosure may adjust an inclination of the seat, move the seat in a horizontal direction, or pivot the seat.

The drive unit according to the present disclosure may deploy a seat airbag provided in the seat.

According to another aspect of the present disclosure, provided is a vehicle occupant protection method including: detecting, by a vehicle sensor, targets present around a vehicle; and increasing, by a space control unit, a space between a side structure and an occupant of the vehicle by controlling a drive unit in accordance with detection information detected by the vehicle sensor.

The increasing of the space according to the present disclosure may include: detecting a collision target present in a predetermined collision area in accordance with the detection information detected by the vehicle sensor; detecting a time of collision with the collision target and determining whether or not to form the space according to the time of collision; determining continuity of whether or not to form the space in accordance with a result of the determination of whether or not to form the space; and when it is determined that there is the continuity, driving a seat in a direction in which the distance between the side structure and the occupant increases.

The detection of the collision target according to the present disclosure may include: detecting a relative distance and a relative velocity between the vehicle and the target and selecting a risk target in accordance with whether or not the target is present in a predetermined risk target area; and detecting the relative distance and the relative velocity between the vehicle and the target and selecting the collision target in accordance with whether or not the target is present in a predetermined collision target area.

The determination of whether or not to form the space according to the present disclosure may include: calculating a time of collision with the collision target; and comparing the time of collision with a predetermined threshold time of collision and determining whether or not to form the space according to whether or not the time of collision is equal to or smaller than the threshold time of collision.

The determination of whether or not to form the space according to the present disclosure may determine that there is the continuity when the number of times that it is determined to form the space is equal to or greater than a predetermined number of times.

The driving of the seat according to the present disclosure may include adjusting an inclination of the seat, moving the seat in a horizontal direction, or pivoting the seat.

The driving of the seat according to the present disclosure may allow a seat protrusion provided on the seat to protrude.

The method according to the present disclosure may further include: calculating, by the space control unit, severity according to a relative velocity and a relative distance between the vehicle and the target; and in the event of an actual collision with the target, deploying the side airbag by adjusting a deployment time according to the severity.

The severity according to the present disclosure may be calculated using a relative velocity weight in the Y axis direction with respect to the target, a relative velocity weight in the X axis direction with respect to the target, a relative distance weight in the Y axis direction with respect to the target, a relative distance weight in the X axis direction with respect to the target, and a weight of an angle of entry of the target.

The deployment of the side airbag according to the present disclosure may include: when a side collision between the vehicle and the target is detected by an airbag sensor, adjusting the deployment time by adjusting an airbag deployment threshold value according to the severity; and deploying the side airbag according to the deployment time adjusted.

The deployment of the side airbag according to the present disclosure may reduce the deployment time of the side airbag by reducing the airbag deployment threshold value as the severity increases.

The vehicle occupant protection apparatus and method according to an aspect of the present disclosure may increase the space between the side structure of a vehicle and an occupant before a side collision of the vehicle and rapidly adjust the deployment time of the side airbag in the event of an actual collision, thereby more safely protecting the occupant in the event of a side collision.

DETAILED DESCRIPTION

Figure 1:
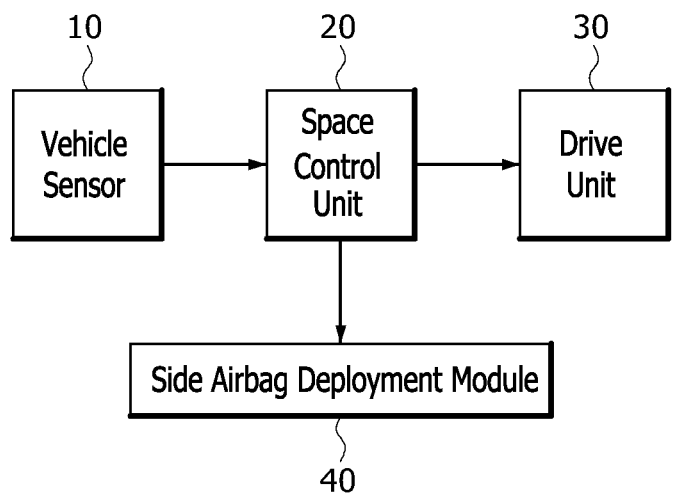
FIG. 1 is a block diagram illustrating the configuration of a vehicle occupant protection apparatus according to an embodiment of the present disclosure.

Hereinafter, a vehicle occupant protection apparatus and method according to the present disclosure will be described in detail with reference to the accompanying drawings through various exemplary embodiments. In the following description, the thicknesses of lines or the sizes of components illustrated in the drawings may be exaggerated for clarity and convenience of explanation. In addition, terms used herein are defined in consideration of functions thereof in the present disclosure, but may vary depending on the intentions of users or operators, or practices. Therefore, the terms shall be defined on the basis of the description throughout the specification.

Figure 2:
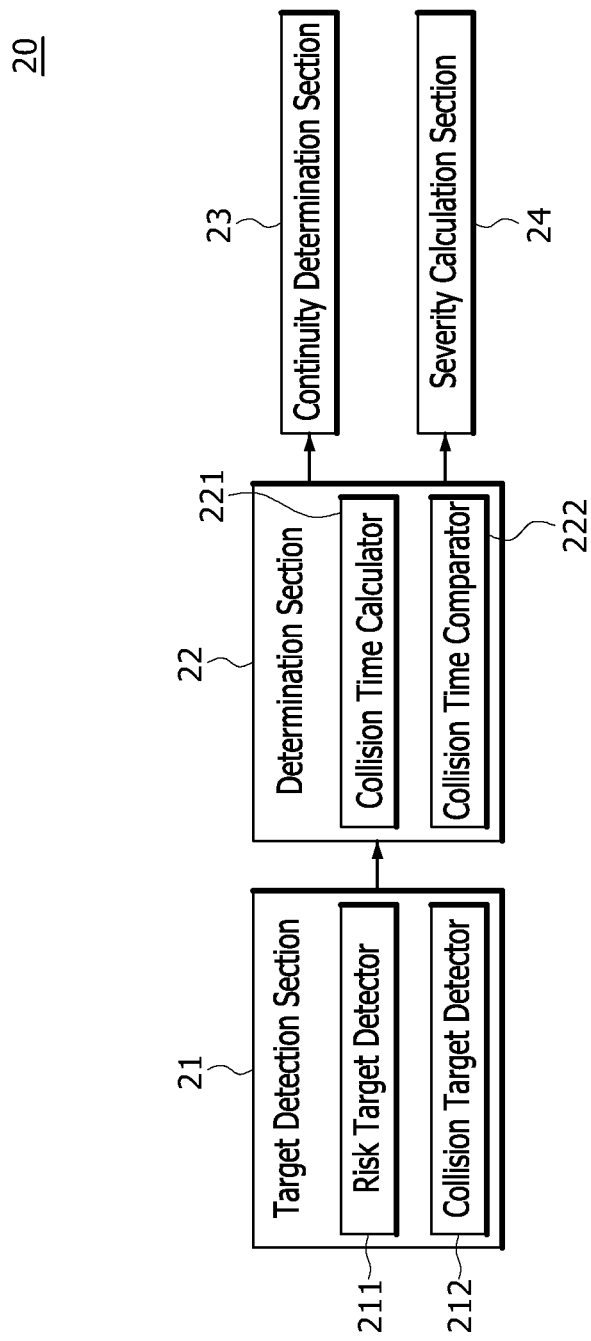
FIG. 2 is a block diagram illustrating the configuration of the space control unit according to the embodiment of the present disclosure.
Figure 3:
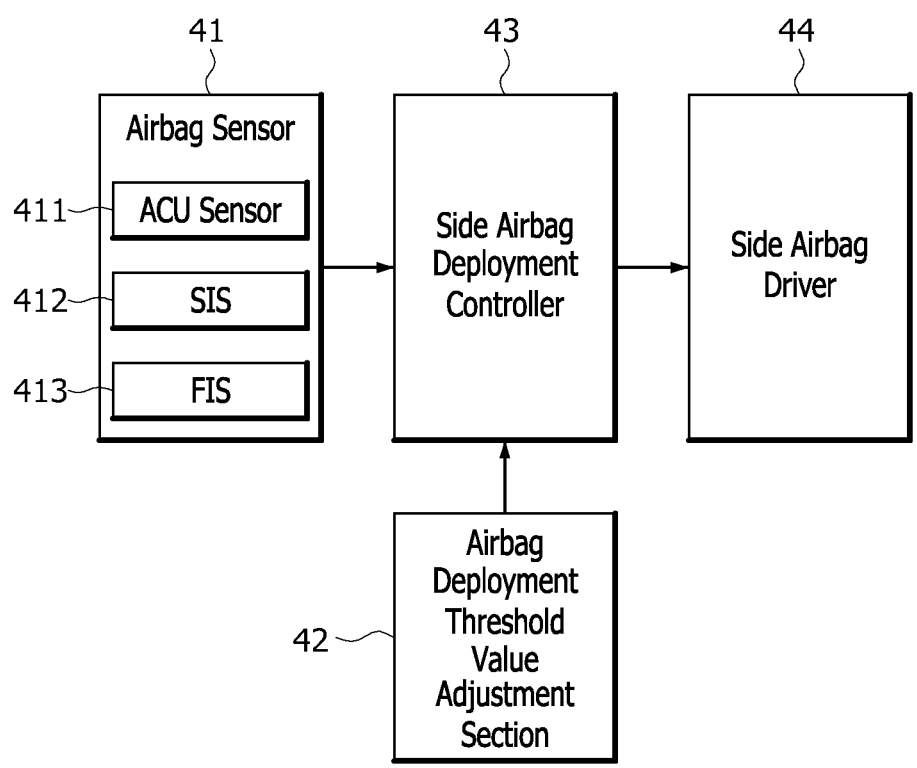
FIG. 3 is a block diagram illustrating the configuration of the side airbag deployment module according to the embodiment of the present disclosure.
Figure 4:
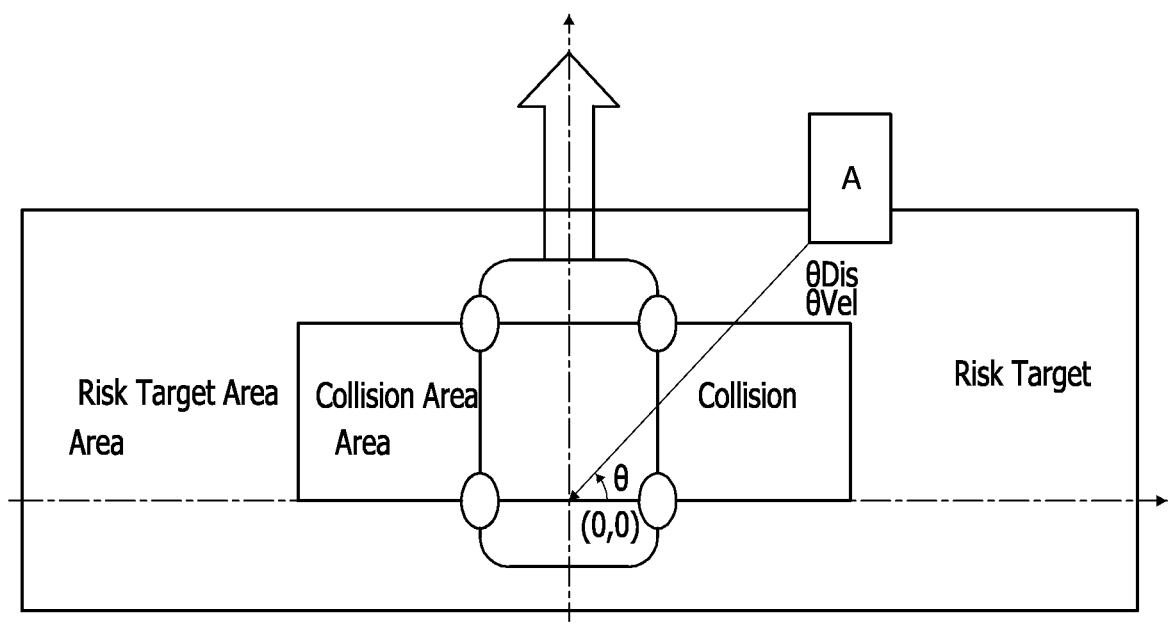
FIG. 4 is a diagram illustrating a relative velocity and a relative distance according to the movement of a vehicle and a target according to an embodiment of the present disclosure.
Figure 5:
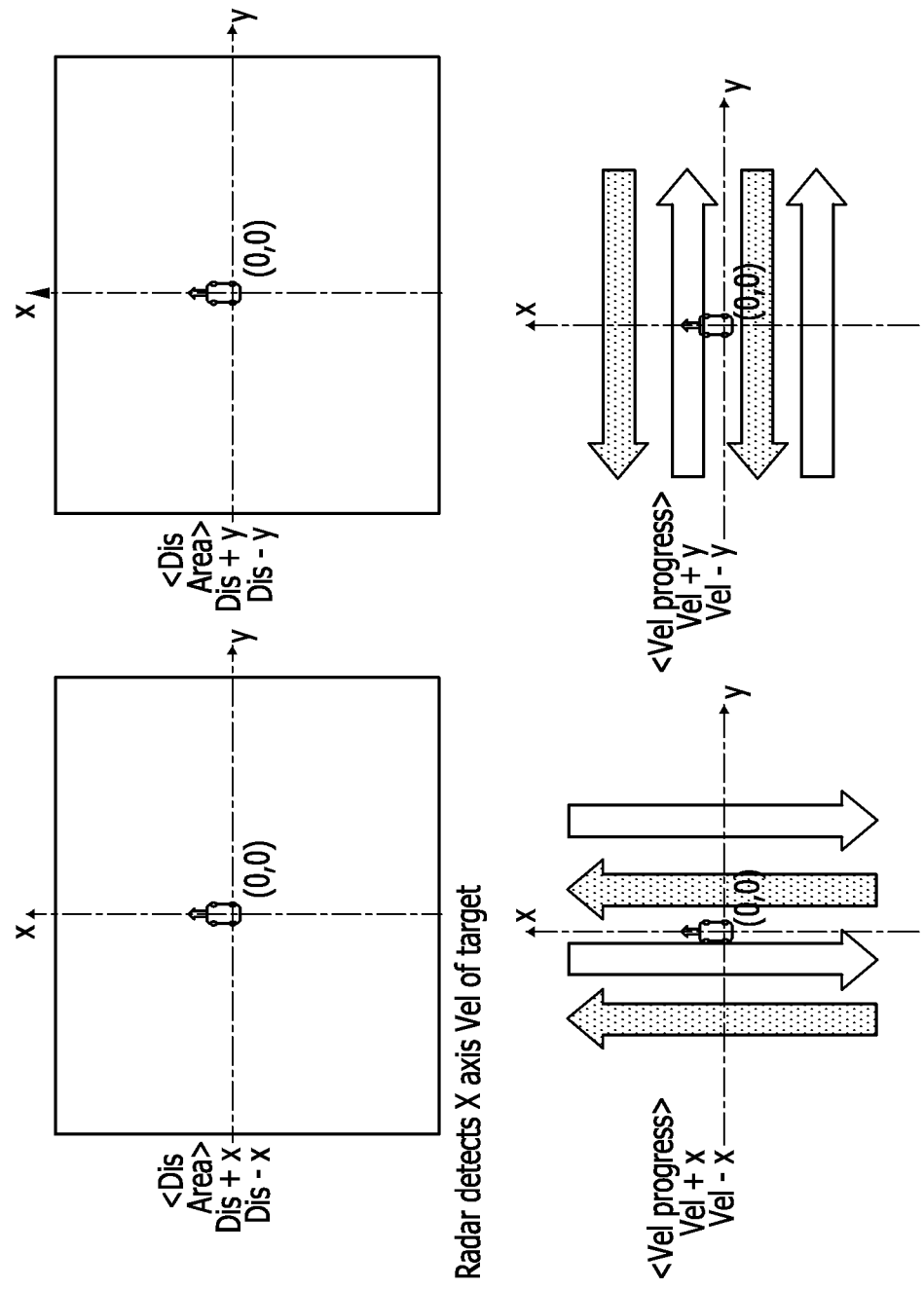
FIG. 5 is a diagram illustrating a process of securing a space and deploying a side airbag according to the position and the movement of a target according to an embodiment of the present disclosure.
Figure 6:
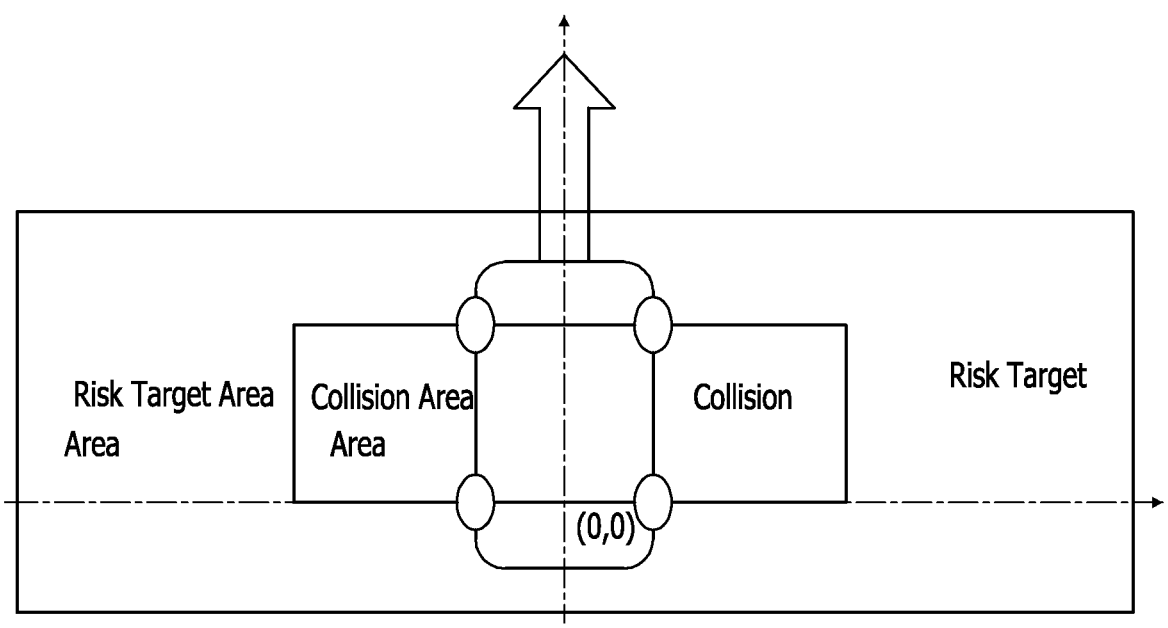
FIG. 6 is a diagram illustrating a process of adjusting an airbag deployment threshold value according to a risk target group and a collision target group according to an embodiment of the present disclosure.

FIG. 1 is a block diagram illustrating the configuration of a vehicle occupant protection apparatus according to an embodiment of the present disclosure, FIG. 2 is a block diagram illustrating the configuration of the space control unit according to the embodiment of the present disclosure, FIG. 3 is a block diagram illustrating the configuration of the side airbag deployment module according to the embodiment of the present disclosure, FIG. 4 is a diagram illustrating a relative velocity and a relative distance according to the movement of a vehicle and a target according to an embodiment of the present disclosure, FIG. 5 is a diagram illustrating a process of securing a space and deploying a side airbag according to the position and the movement of a target according to an embodiment of the present disclosure, FIG. 6 is a diagram illustrating a process of adjusting an airbag deployment threshold value according to a risk target group and a collision target group according to an embodiment of the present disclosure, and FIGS. 7 to 11 are diagrams illustrating an example in which a space is formed between a side structure of a vehicle and an occupant according to an embodiment of the present disclosure.

Referring to FIG. 1, the vehicle occupant protection apparatus according to an embodiment of the present disclosure includes a vehicle sensor 10, a space control unit 20, a drive unit 30, and a side airbag deployment module 40.

The vehicle sensor 10 detects a target present around a vehicle and generates detection information indicating a detection of the target. Examples of the vehicle sensor 10 may include, but are not limited to, a radar sensor, a LiDAR sensor, an ultrasonic wave sensor, an image sensor, and the like.

The vehicle sensor 10 may be disposed in a front portion, a side front portion, or a side portion of the vehicle, but the position thereof is not limited thereto.

The space control unit 20 controls the drive unit 30 on the basis of the detection information detected by the vehicle sensor 10 to protect an occupant from a side structure 50.

Examples of the side structure 50 may include a pillar or a door of the vehicle, and may include any structure that may injure an occupant in the event of a side collision.

The drive unit 30 may form or increase a space 34 by increasing the distance between the side structure 50 and the occupant before an actual collision between the vehicle and the target. The drive unit 30 will be described later.

When a sufficient space is secured in response to the increase of the space 34 between the side structure 50 and the occupant that may be formed by the drive unit 30, the possibility that the occupant may be protected from the side structure 50 in the event of an actual collision is increased.

Typically, the death rate of occupants by side collisions is higher than the death rate of occupants by front collisions. This is because, in the event of a front collision, energy may be absorbed by front structures, such as a bumper or a side member, of the vehicle, and the space 34 is secured between the occupant and an interior component within the cabin.

In contrast, fewer side structures 50 configured to reduce collision impact are provided on the side of the vehicle, and in the event of a side collision, the target may directly apply an impact to the occupant. Thus, the side collision is more dangerous than the front collision. In addition, the space 34 between the side structure 50 and the occupant on the side is smaller than in the front, and thus, the space 34 for side airbag protection is not sufficient.

Accordingly, it is possible to protect the occupant from the side structure 50 in an actual collision by securing the space 34 between the side structure 50 and the occupant before the side collision.

Referring to FIG. 2, the space control unit 20 includes a target detection section 21, a determination section 22, a continuity determination section 23, and a severity calculation section 24.

The target detection section 21 detects the target present in a predetermined collision area on the basis of the detection information detected by the vehicle sensor 10. The target detection section 21 includes a risk target detector 211 and a collision target detector 212.

The risk target detector 211 selects a target present in a predetermined risk target area as a risk target by detecting a relative distance and a relative velocity between the vehicle and the target.

The risk target area is an area set from the vehicle to select the target as the risk target. The risk target area allows the risk target having relatively high risk of side collision to be selected.

The collision target detector 212 selects a target present in a predetermined collision target area as a collision target by detecting a relative distance and a relative velocity between the vehicle and the target.

The collision target area is an area set from the vehicle to select the target as the collision target. The collision target area allows the collision target directly before an actual side collision to be selected.

FIG. 4 illustrates the risk target area and the collision target area. The collision target area is present within the risk target area.

For example, assuming that a target A approaches to a vehicle at an angle of entry $\theta$, the relative distance and the relative velocity between the vehicle and the target may be expressed by a relative distance DisX=$\theta$Dis×sin $\theta$ in the X axis direction, a relative distance DisY=$\theta$Dis×cos $\theta$ in the Y axis direction, a relative velocity VelX=$\theta$Vel×sin $\theta$ in the X axis direction, and a relative velocity VelY=$\theta$Vel×cos $\theta$ in the Y axis direction.

Here, each of DisX, DisY, VelX, and VelY has a direction value according to the position and the direction of movement of the target.

For example, when the target approaches the vehicle with respect to the position (0, 0) of the vehicle, DisX, DisY, VelX, and VelY have direction values +DisX, −DisY, −VelX, and +VelY, respectively. When the target moves away from the vehicle with respect to the position (0, 0) of the vehicle, DisX, DisY, VelX, and VelY have direction values +DisX, −DisY, +VelX, and −VelY.

Then, a directional map as illustrated in FIG. 5 may be formed, in which target information may be defined, for example, each target may be defined as a risk target or a collision target.

That is, on the basis of the directional map illustrated in FIG. 5, the space 34 may be secured or the side airbag may be deployed by estimating the current position and movement with respect to the collision target. For example, when a Dis area may be divided into Dis +X, Dis −X, Dis +Y, and Dis −Y areas and the Vel progress of the target is defined as Vel +X, Vel −X, Vel +Y, and Vel −Y, the target may be classified as the risk target or the collision target on the basis of the divided areas and the Vel progress.

Referring to FIG. 6, when the relative velocity and relative distance of any target among targets having directionality approaching the vehicle are present in the risk target area, the corresponding target may be selected as a risk target. Only this risk target can be selected as a collision target.

For example, a target having direction values corresponding to +DisX, +DisY, and −VelY can be a risk target, whereas a target having direction values corresponding to +DisX, +DisY, and +VelY cannot be a risk target.

In addition, when any target among risk targets approaching the vehicle is included in the collision area, the corresponding target may be selected as a collision target.

For example, a target having direction values corresponding to +DisX, +DisY, and −VelY can be a collision target, a target having direction values corresponding to +DisX, +DisY, and +VelY cannot be a collision target.

The determination section 22 detects or estimates a time of collision with the collision target, and determines whether or not to form the space 34 between the side structure 50 and the occupant according to the time of collision.

The determination section 22 includes a collision time calculator 221 and a collision time comparator 222.

The collision time calculator 221 calculates the time of collision with the collision target present in the collision area by the following Equation 1 using the relative velocity, the relative distance, and the relative acceleration with respect to the collision target.

$$TTC^{-1} = -\frac{-v_{rel} \pm \sqrt{(v_{rel})^2 - 2 \cdot p_{rel} \cdot a_{rel}}}{2 \cdot p_{rel}} \quad \text{Equation 1}$$

In Equation 1, $TTC^{-1}$ is the time of collision with the collision target, $V_{rel}$ is the relative velocity with respect to the collision target, $P_{rel}$ is the relative distance with respect to the collision target, and $a_{rel}$ is the relative acceleration with respect to the collision target.

The collision time comparator 222 determines whether or not the time of collision is equal to or smaller than a predetermined threshold time of collision by comparing the time of collision calculated by the collision time calculator 221 with the predetermined threshold time of collision, and determines whether or not to increase the space 34 between the side structure 50 and the occupant according to the result of the determination.

Here, when the time of collision is equal to or smaller than the threshold time of collision, the collision time comparator 222 determines to form the space 34 between the side structure 50 and the occupant.

The continuity determination section 23 reviews the result of the comparison of the collision time comparator 222 and determines target-specific continuity of whether or not the determination section 22 determines the space to be formed. That is, when the number of times that the determination section 22 determines to form the space 34 is equal to or greater than a predetermined number of times, the continuity determination section 23 determines that there is the continuity.

When the continuity determination section 23 determines that there is the continuity, the drive unit 30 forms the space 34 between the side structure 50 and the occupant.

In contrast, when the continuity determination section 23 determines that there is the continuity, the drive unit 30 does not form the space 34 between the side structure 50 and the occupant.

The severity calculation section 24 calculates severity according to the relative velocity and the relative distance between the vehicle and the collision target.

The severity calculation section 24 may calculate the severity using a relative velocity weight in the Y axis direction with respect to the collision target, a relative velocity weight in the X axis direction with respect to the collision target, a relative distance weight in the Y axis direction with respect to the collision target, a relative distance weight in the X axis direction with respect to the collision target, and a weight of an angle of entry of the collision target. Each of these weights is previously set.

For example, the severity calculation section 24 may calculate the severity by multiplying each of the relative velocity weight in the Y axis direction with respect to the collision target, the relative velocity weight in the X axis direction with respect to the collision target, the relative distance weight in the Y axis direction with respect to the collision target, and the relative distance weight in the X axis direction with respect to the collision target with the weight of the angle of entry of the collision target, and then summing up the multiplied values.

In an actual collision between the vehicle and the target, the side airbag deployment module 40 deploys the side airbag by adjusting a deployment time according to the severity.

Referring to FIG. 3, the side airbag deployment module 40 includes an airbag sensor 41, an airbag deployment threshold value adjustment section 42, a side airbag driver 44, and a side airbag deployment controller 43.

The airbag sensor 41 includes an airbag control unit (ACU) sensor 411, a side impact sensor (SIS) 412, and a front impact sensor (FIS) 413.

The ACU sensor 411 is disposed at the center of the vehicle to detect accelerations in the longitudinal direction ACU-X and the transverse direction ACU-Y of the vehicle.

The SISs 412 are disposed on a left side portion and a right side portion of the vehicle to detect a left side collision and a right side collision of the vehicle, respectively.

FISs 413 are disposed on a front left portion and a front right portion of the vehicle to detect a front left collision and a front right collision of the vehicle, respectively.

In the present embodiment, the ACU sensor 411, the SISs 412, and the FISs 413 have been illustrated as examples of sensors configured to detect a side collision of the vehicle, but the present disclosure is not limited thereto.

The airbag deployment threshold value adjustment section 42 adjusts the airbag deployment threshold value according to the severity.

The airbag deployment threshold value is a threshold value for determining whether or not to deploy the side airbag. When the airbag deployment threshold value is reduced, the time of deployment of the side airbag may be reduced, and thus, the side airbag may be deployed relatively fast.

Thus, when the severity is greater, the airbag deployment threshold value adjustment section 42 may reduce the airbag deployment threshold value so that the side airbag may be deployed relatively fast.

The side airbag driver 44 is disposed inside the vehicle and configured to explode an inflator (not shown) in response to a control signal from the side airbag deployment controller 43 to deploy the side airbag, thereby protecting the occupant. Neither the position of provision nor structure of the side airbag is specifically limited.

When the side collision between the vehicle and the collision target is detected by the airbag sensor 41, the side airbag deployment controller 43 adjusts the deployment time according to the airbag deployment threshold value adjusted by the airbag deployment threshold value adjustment section 42 and controls the side airbag driver 44 to rapidly deploy the side airbag according to the deployment time.

For example, the side airbag deployment controller 43 receives transverse acceleration and deceleration ACUY of the ACU sensor 411 and side transverse acceleration and deceleration SISY of the SIS 412 and integrates each of the transverse accelerations and decelerations. Subsequently, the side airbag deployment controller 43 compares the transverse acceleration and deceleration ACUY of the ACU sensor 411 and velocity values thereof and the side transverse acceleration and deceleration SISY of the SIS 412 and velocity values thereof with predetermined airbag deployment threshold values, respectively, and deploys the side airbag according to the result of the comparison.

Here, the airbag deployment threshold value adjustment section 42 adjusts the airbag deployment threshold value according to the severity. The side airbag deployment controller 43 deploys the side airbag according to the adjusted airbag deployment threshold value. As the airbag deployment threshold value is adjusted as described above, the side airbag deployment controller 43 adjusts the deployment time, and controls the side airbag driver 44 to deploy the side airbag relatively fast according to the adjusted deployment time.

In this case, the airbag deployment threshold value adjustment section 42 may reduce the airbag deployment threshold value as the severity increases. In this case, the side airbag deployment controller 43 protects the occupant by deploying the side airbag relatively fast.

For reference, in the present embodiment, the ACU sensor 411 and the SIS 412 have been illustrated as examples, but whether or not to deploy the side airbag may be determined according to the value detected by the FIS 413.

The drive unit 30 forms the space 34 between the side structure 50 and the occupant within the vehicle in the event of a side collision between the vehicle and the target. A variety of methods for forming the space 34 between the side structure 50 and the occupant within the vehicle may be employed.

For example, the drive unit 30 may drive a seat 60 in a direction in which the distance between the side structure 50 and the occupant increases in order to form the space 34 between the side structure 50 and the occupant.

In this regard, the drive unit 30 may deploy a seat protrusion 32 on the seat of the occupant, adjust the inclination of the seat 60, move the seat 60 in a horizontal direction, or pivot the seat 60.

The seat protrusion 32 may be fabricated in the shape of an airbag configured to be deployed or a mechanical structure configured to protrude, but is not specifically limited.

Figure 7:
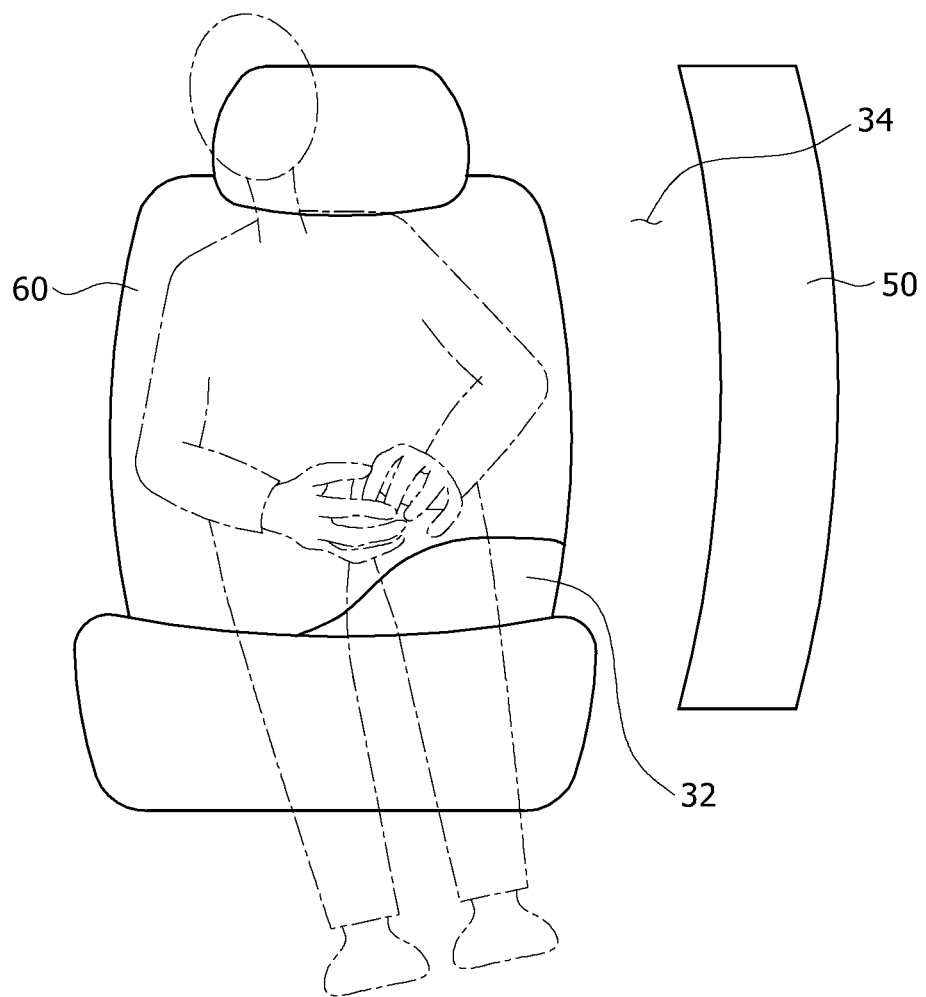
FIGS. 7 to 11 are diagrams illustrating an example in which a space is formed between a side structure of a vehicle and an occupant according to an embodiment of the present disclosure.

FIG. 7 illustrates an example in which the seat protrusion 32 is disposed on a seat cushion 61 of the seat 60 and the drive unit 30 allows the seat protrusion 32 to protrude, so that the body of the occupant is inclined so as to increase the distance between the side structure 50 and the occupant.

Figure 8:
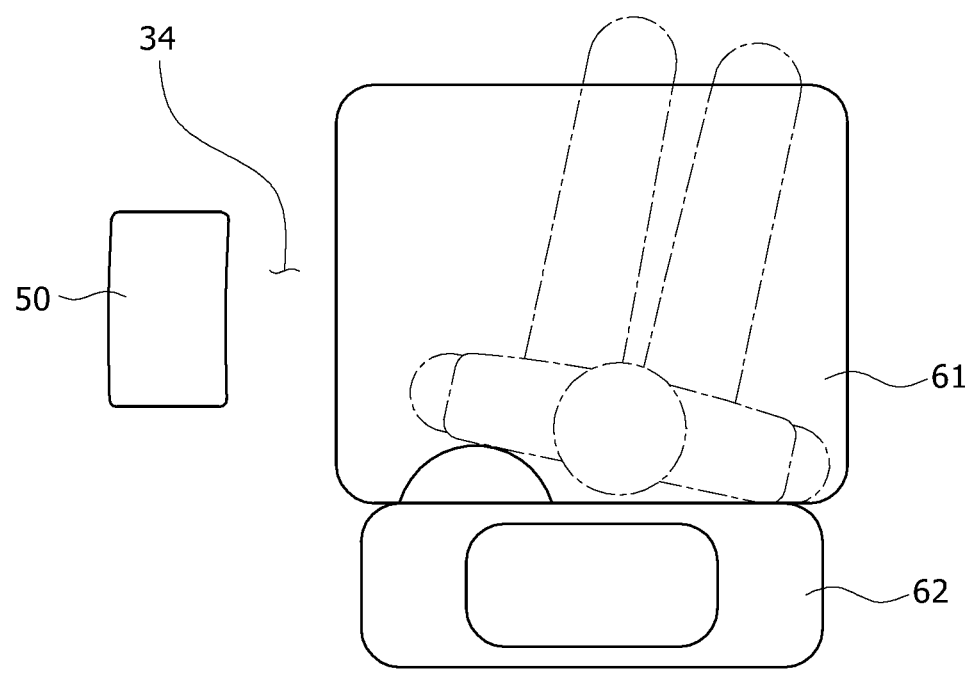

FIG. 8 illustrates an example in which the seat protrusion 32 is disposed on a seatback 62 of the seat 60 and the drive unit 30 allows the seat protrusion 32 to protrude, so that the body of the occupant is inclined so as to increase the distance between the side structure 50 and the occupant.

Figure 9:
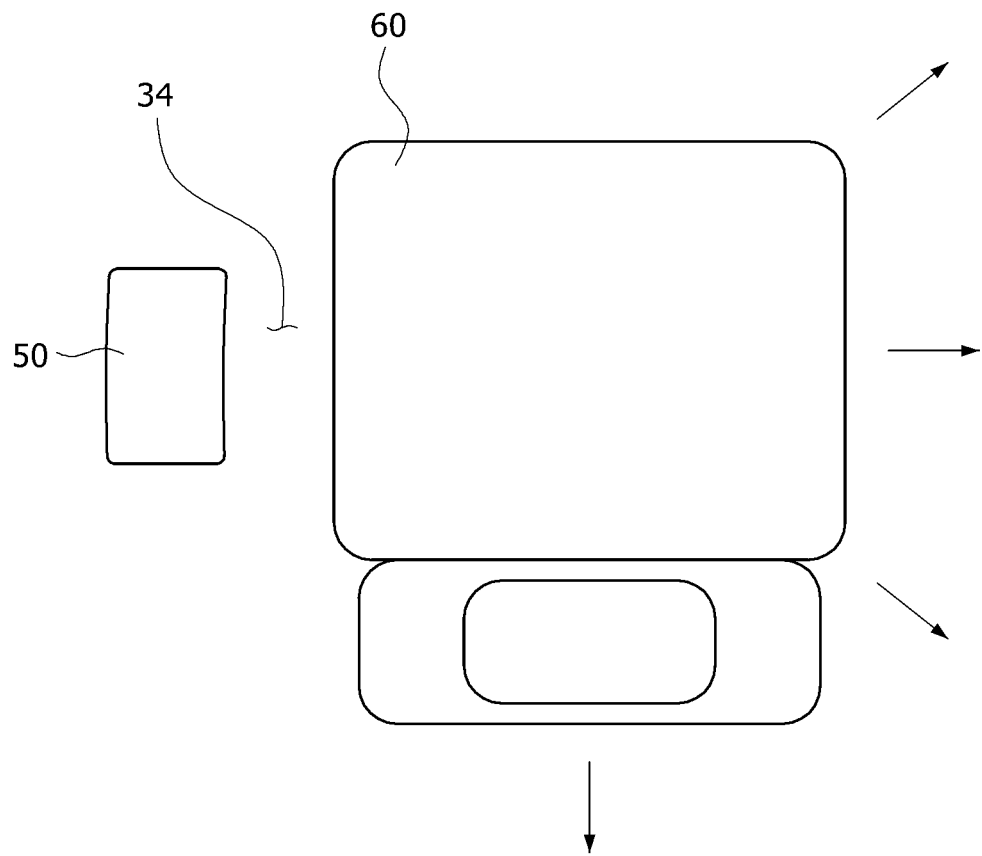

FIG. 9 illustrates an example in which the drive unit 30 moves the seat 60 in a direction away from the side structure 50 (i.e., in a direction indicated by an arrow), so that the distance between the side structure 50 and the occupant is increased.

Figure 10:
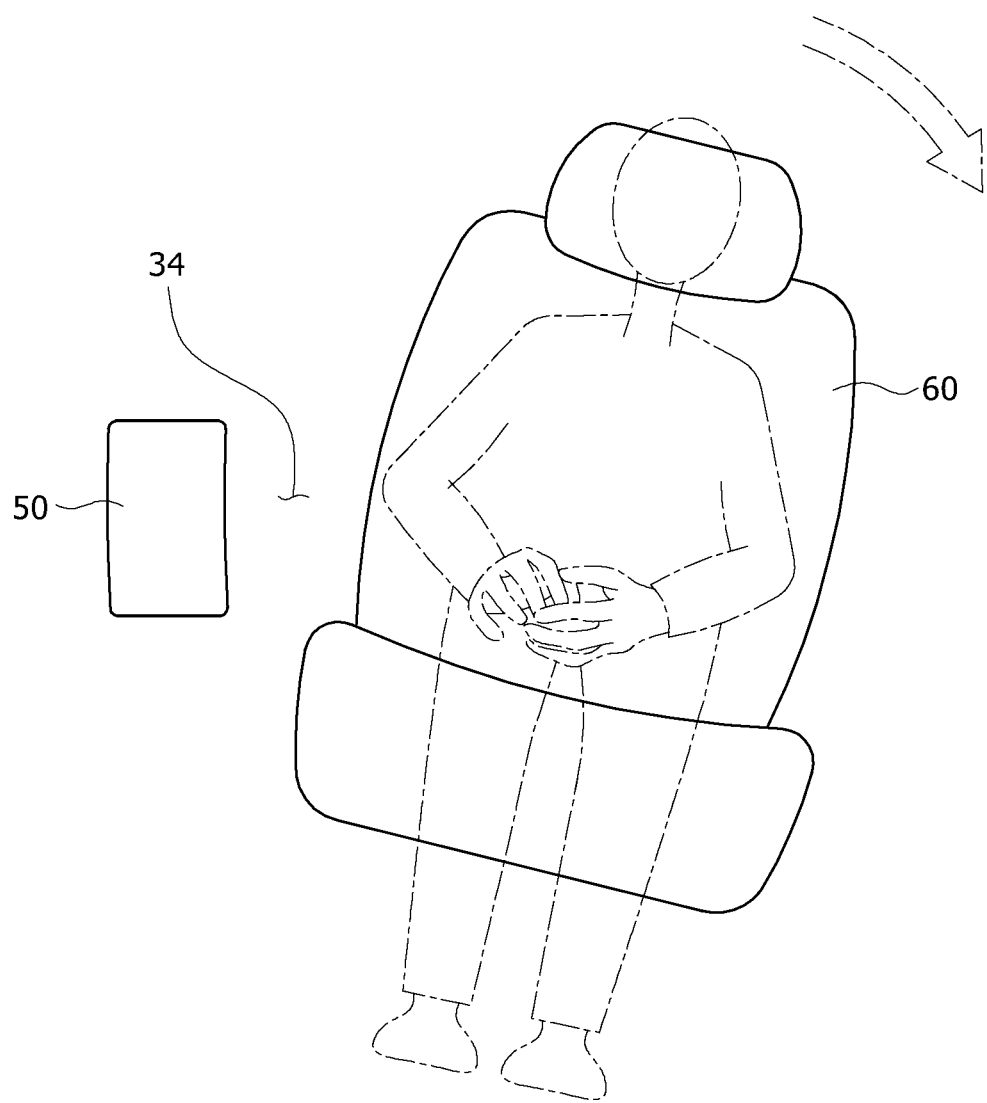

FIG. 10 illustrates an example in which the drive unit 30 inclines the seat 60 in the inward direction of the vehicle, so that the body of the occupant is inclined so as to increase the distance between the side structure 50 and the occupant.

Figure 11:
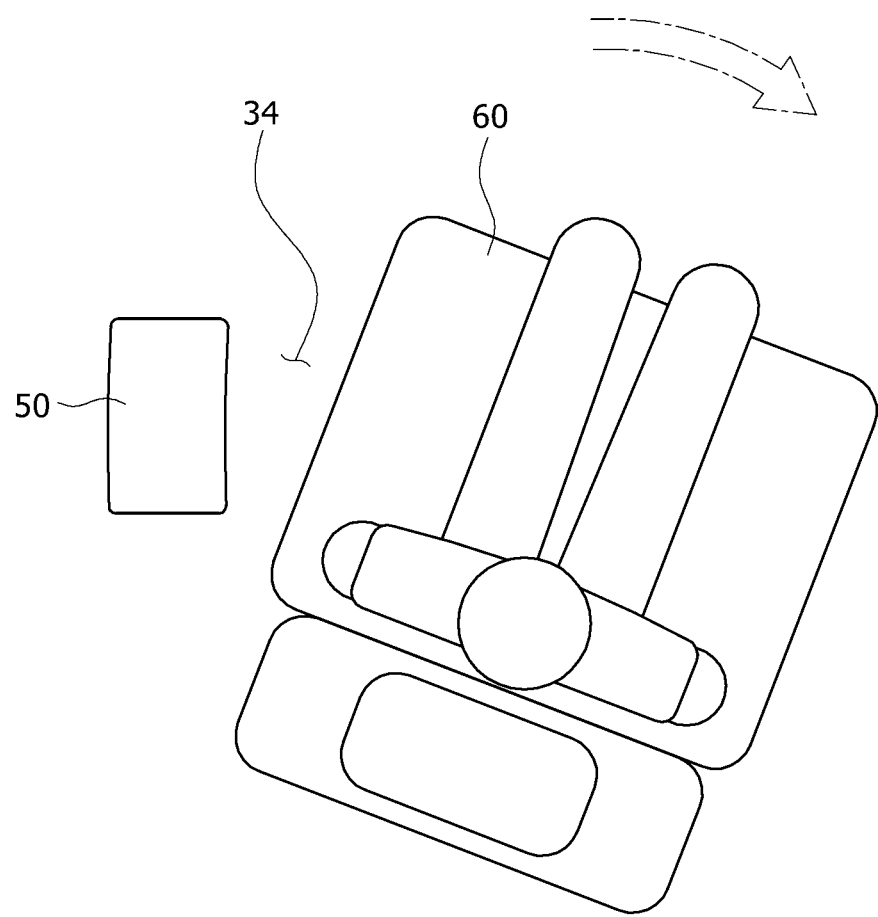

FIG. 11 illustrates an example in which drive unit 30 pivots the seat 60 in the inward direction of the vehicle, so that the body of the occupant is inclined so as to increase the distance between the side structure 50 and the occupant.

A method and mechanical structure by which the drive unit 30 forms the space 34 between the side structure 50 and the occupant are not specifically limited.

Hereinafter, a vehicle occupant protection method according to an embodiment of the present disclosure will be described in detail with reference to FIG. 12.

Figure 12:
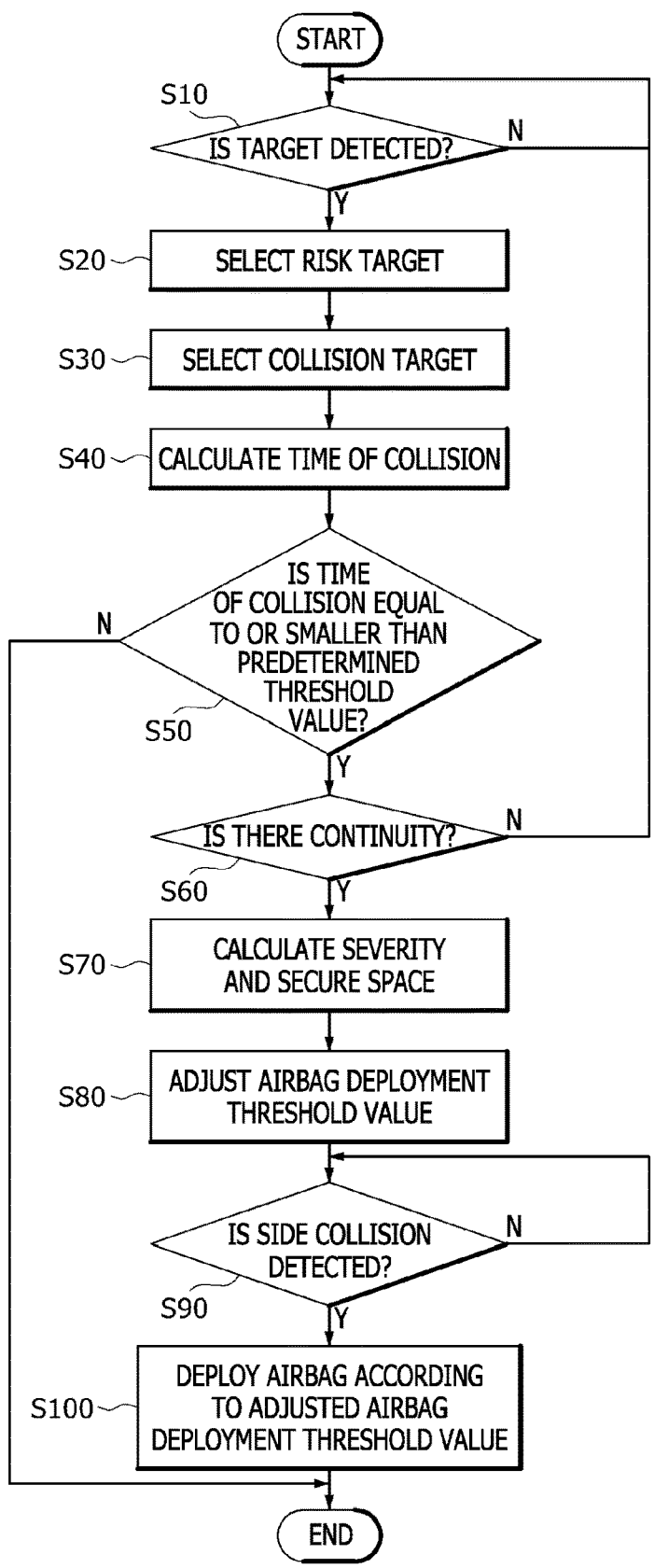
FIG. 12 is a flowchart illustrating a vehicle occupant protection method according to an embodiment of the present disclosure.

FIG. 12 is a flowchart illustrating a vehicle occupant protection method according to an embodiment of the present disclosure.

Referring to FIG. 12, first, the vehicle sensor 10 detects targets present around a vehicle in S10.

Subsequently, the risk target detector 211 selects a target present in a predetermined risk target area as a risk target by detecting the relative distance and the relative velocity between the vehicle and the target using the detection information detected by the vehicle sensor 10 in S20.

The collision target detector 212 selects a risk target present in the collision target area, among risk targets, as a collision target by detecting the relative distance and the relative velocity between the vehicle and the target in S30.

As the collision target is selected, the collision time calculator 221 calculates the time of collision with the collision target present in the collision area using the relative velocity, the relative distance, and the relative acceleration with respect to the collision target in S40.

The collision time comparator 222 compares the time of collision, calculated by the collision time calculator 221, with a threshold time of collision and determines whether or not the time of collision is equal to or smaller than the threshold time of collision in S50.

In this case, the collision time comparator 222 determines the space 34 to be formed when the time of collision is equal to or smaller than the threshold time of collision.

In addition, when collision time comparator 222 determines the space 34 to be formed, the continuity determination section 23 determines whether or not there is continuity by determining the number of operations of forming the space is equal to or greater than a predetermined number of times in S60.

When there is continuity as the result of the determination in S60, the drive unit 30 increases and secures the space 34 between the side structure 50 and the occupant as illustrated in FIGS. 7 to 11, and the severity calculation section 24 calculates severity according to the relative velocity and the relative distance between the vehicle and the collision target in S70.

In this case, the severity calculation section 24 may calculate the severity by multiplying the relative velocity weight in the Y axis direction with respect to the collision target, the relative velocity weight in the X axis direction with respect to the collision target, the relative distance weight in the Y axis direction with respect to the collision target, and the relative distance weight in the X axis direction with respect to the collision target with a weight of an angle of entry of the collision target, and then summing up the multiplied values.

In the meantime, in the above-described process, the ACU sensor 411 detects accelerations in the longitudinal direction ACU-X and the transverse direction ACU-Y of the vehicle, the SISs 412 detect a left side collision and a right side collision of the vehicle, respectively, and FISs 413 detect a front left collision and a front right collision of the vehicle, respectively.

Here, the airbag deployment threshold value adjustment section 42 adjusts an airbag deployment threshold value according to the severity in S80. Afterwards, when an actual collision is detected in S90, the airbag deployment threshold value adjustment section 42 drives the side airbag by adjusting a deployment time according to the adjusted airbag deployment threshold value in S100.

In this case, as the severity increases, the airbag deployment threshold value adjustment section 42 reduces the airbag deployment threshold value. In this case, the side airbag deployment controller 43 may protect the occupant by deploying the side airbag relatively fast.

As described above, the vehicle occupant protection apparatus and method according to an embodiment of the present disclosure can increase a space between a side structure of a vehicle and an occupant before a side collision of the vehicle and rapidly adjust the deployment time of a side airbag in the event of an actual collision, thereby more safely protecting the occupant in the event of a side collision.

The implementations described herein may be embodied as, for example, a method, a process, a device, a software program, a data stream, or signals. Even in the case that the present disclosure has been discussed in the context of a single form of implementation (e.g., only discussed as a method), the discussed features may also be realized in another form (e.g., a device or a program). The device may be realized in a suitable form, such as hardware, software, or firmware. The method may be realized in a device, such as a processor, typically referred to as a processing device including, for example, a computer, a microprocessor, an integrated circuit, a programmable logic device, or the like. The processor may also include a computer, a cellular phone, personal digital assistant (PDA), and other communication devices facilitating information communication between final users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for protecting an occupant in a vehicle, comprising:
a vehicle sensor configured to detect a target present around a vehicle and generate detection information indicating a detection of the target;
a drive unit configured to increase a space between a side structure of the vehicle and an occupant within the vehicle when a side collision occurs between the vehicle and the target to protect the occupant from the side structure of the vehicle; and
a space control unit configured to control, based on the detection information, the drive unit to increase the space between the side structure and the occupant,
wherein the space control unit comprises:
a target detection section configured to detect, based on the detection information, the target present in a predetermined collision area;
a determination section configured to estimate a time of collision with the target and determine, based on the estimated time of collision, whether to increase the space between the side structure and the occupant; and
a continuity determination section configured to determine a continuity with respect to determining whether to increase the space,
wherein the continuity determination section is configured to determine that there is the continuity when a number of times that the determination section determines to increase the space is equal to or greater than a predetermined number of times.

2. The apparatus of claim 1, wherein the target detection section comprises:
a risk target detector configured to (1) detect a relative velocity of the target with respect to the vehicle and (2) determine, based on the detected relative velocity of the target, whether the detected target is a risk target present in a predetermined risk target area; and
a collision target detector configured to (1) detect the relative distance between the vehicle and the target and the relative velocity of the target with respect to the vehicle, and (2) determine, based on the detected relative distance and relative velocity, whether the detected target is a collision target present in a predetermined collision target area.

3. The apparatus of claim 1, wherein the determination section comprises:
a collision time calculator configured to estimate the time of collision with the target present in the predetermined collision area; and
a collision time comparator configured to (1) compare the estimated time of collision with a predetermined threshold time of collision, and (2) determine whether to increase the space based on a result of the comparison.

4. The apparatus of claim 1, wherein the drive unit is configured to drive a seat of the vehicle in a direction in which a distance between the side structure and the occupant is increased.

5. The apparatus of claim 4, wherein the drive unit is configured to perform at least one of adjusting an inclination of the seat, moving the seat in a horizontal direction, or pivoting the seat.

6. The apparatus of claim 4, wherein the drive unit is configured to deploy a seat airbag provided in the seat.

7. An apparatus for protecting an occupant in a vehicle, comprising:
a vehicle sensor configured to detect a target present around a vehicle and generate detection information indicating a detection of the target;
a drive unit configured to increase a space between a side structure of the vehicle and an occupant within the vehicle when a side collision occurs between the vehicle and the target to protect the occupant from the side structure of the vehicle; and
a space control unit configured to control, based on the detection information, the drive unit to increase the space between the side structure and the occupant,
wherein the space control unit comprises a severity calculation section configured to calculate a severity of the side collision based on a relative velocity of the target with respect to (1) the vehicle and (2) a relative distance between the vehicle and the target.

8. The apparatus of claim 7, wherein the severity calculation section is configured to calculate the severity based on a relative velocity weight in a Y axis direction with respect to the target, a relative velocity in an X axis direction with respect to the target, a relative distance in the Y axis direction with respect to the target, a relative distance in the X axis direction with respect to the target, and an angle of entry of the target.

9. The apparatus of claim 7, further comprising a side airbag deployment module configured to:

adjust a deployment time based on the calculated severity of the side collision; and deploy the side airbag based on the adjusted deployment time.

10. The apparatus of claim 9, wherein the side airbag deployment module comprises:
   an airbag sensor configured to detect the side collision between the vehicle and the target;
   a side airbag driver configured to deploy the side airbag;
   an airbag deployment threshold value adjustment section configured to adjust an airbag deployment threshold value based on the calculated severity; and
   a side airbag deployment controller configured to (1) adjust the deployment time based on the adjusted airbag deployment threshold value and (2) control the side airbag driver to deploy the side airbag based on the adjusted deployment time.

11. The apparatus of claim 10, wherein the side airbag deployment controller is configured to reduce the airbag deployment threshold value when the severity is increased.

12. A method of protecting an occupant in a vehicle, the method comprising:
   detecting a target present around a vehicle;
   generating target information indicating a detection of the target; and
   increasing, based on the target information, a space between a side structure of the vehicle and an occupant in the vehicle when a side collision occurs between the vehicle and the target,
   wherein increasing the space comprises:
      determining, based on the detection information, whether the detected target is a collision target present in a predetermined collision area;
      estimating a time of collision of the vehicle with the collision target;
      determining, based on the estimated time of the collision, whether to increase the space between the side structure and the occupant;
      determining, based on a result of determining whether to increase the space, whether there is a continuity with respect to determining whether to increase the space; and
      in response to determining that there is the continuity, driving a seat of the vehicle in a direction in which a distance between the side structure and the occupant is increased,
      wherein determining whether there is the continuity comprises determining that there is continuity when a number of times that it is determined to increase the space is equal to or greater than a predetermined number of times.

13. A method of protecting an occupant in a vehicle, the method comprising:
   detecting a target present around a vehicle;
   generating target information indicating a detection of the target; and
   increasing, based on the target information, a space between a side structure of the vehicle and an occupant in the vehicle when a side collision occurs between the vehicle and the target;
   calculating a severity of the side collision based on a relative velocity of the target with respect to the vehicle and a relative distance between the vehicle and the target;
   adjusting, based on the calculated severity, a deployment time of a side airbag of the vehicle; and
   deploying the side airbag based on the adjusted deployment time.

14. The method of claim 13, wherein the severity is calculated using a relative velocity in a Y axis direction with respect to the target, a relative velocity in an X axis direction with respect to the target, a relative distance in the Y axis direction with respect to the target, a relative distance in the X axis direction with respect to the target, and an angle of entry of the target.

15. The method of claim 13, wherein adjusting the deployment time of the side airbag comprises adjusting an airbag deployment threshold value based on the calculated severity.

16. The method of claim 15, further comprising reducing the airbag deployment threshold value when the calculated severity is increased.

17. The method of claim 12, wherein determining that the detected target is the collision target comprises:
   detecting a relative distance between the vehicle and the target and a relative velocity of the target with respect to the vehicle; and
   determining, based on the detected relative distance and relative velocity, whether the detected target is (1) a risk target present in a predetermined risk target area or (2) a collision target present in a predetermined collision target area.

18. The method of claim 12, wherein determining whether to increase the space comprises:
   calculating the time of collision;
   comparing the calculated time of collision with a predetermined threshold time of collision; and
   determining whether to increase the space based on a result of comparing the time of collision with the predetermined threshold time of collision.

19. The method of claim 12, wherein driving the seat comprises at least one of adjusting an inclination of the seat, moving the seat in a horizontal direction, and pivoting the seat.

20. The method of claim 12, wherein:
   the seat comprises a seat protrusion, and
   driving the seat comprises causing the seat protrusion to protrude from the seat.

* * * * *